Oct. 26, 1943.    J. N. M. HOWELLS    2,332,575
STEREOSCOPIC DEVICE
Filed March 21, 1940

INVENTOR
JOHN N. M. HOWELLS
BY
ATTORNEY

Patented Oct. 26, 1943

2,332,575

UNITED STATES PATENT OFFICE 2,332,575

STEREOSCOPIC DEVICE

John N. M. Howells, Kittery, Maine

Application March 21, 1940, Serial No. 325,139

13 Claims. (Cl. 88—16.6)

This invention relates to stereoscopic devices.

One of the objects of the invention is to produce a highly improved stereoscopic device adapted for use with motion picture apparatus of the type which employs a single film having right and left images alternately photographed on consecutive frames.

Another object of my invention is to provide a device of the character described having a plurality of moving reflectors associated therewith.

Another object of my invention is to provide a stereoscopic device of the character described which increases the clarity of the reflected image.

Another object of my invention is to provide a device of the character described which shall be relatively easy and economical to manufacture, simple to operate and which shall be rugged in construction and take or reproduce stereoscopic motion pictures with a high degree of fidelity.

Other objects of this invention will in part be obvious and in part hereinafter pointed out.

Certain features of my invention shown herein are fully shown, described and claimed in my copending application for Stereoscopic devices, Serial No. 325,140, filed March 21, 1940.

In the accompanying drawing in which is shown one of the various possible embodiments of my invention:

Figure 1:
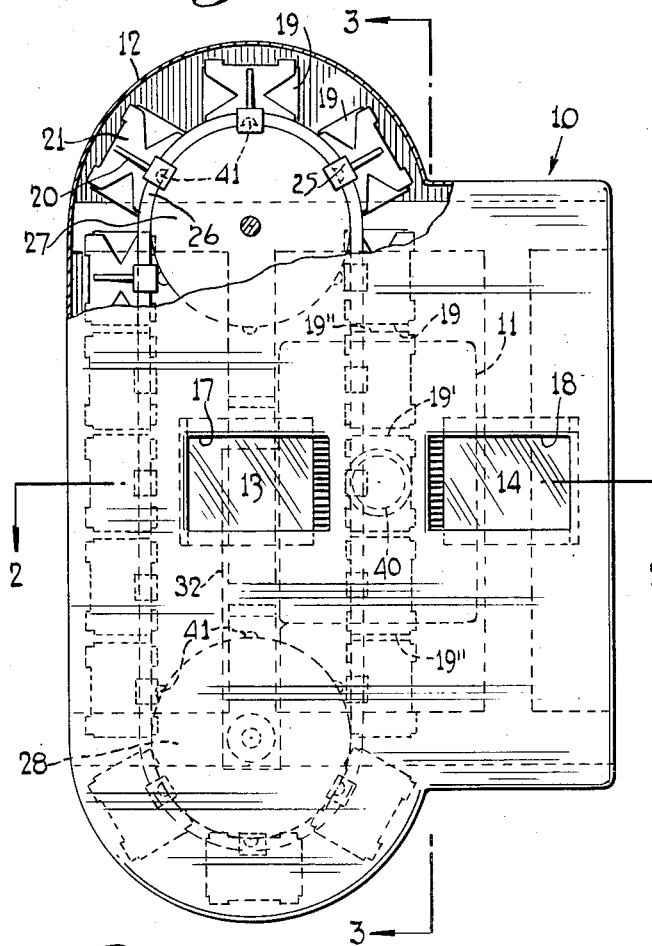
Fig. 1 is a front view of a stereoscopic device embodying my invention attached to a motion picture camera, with the casing partially broken away to show the interior thereof.
Figure 3:
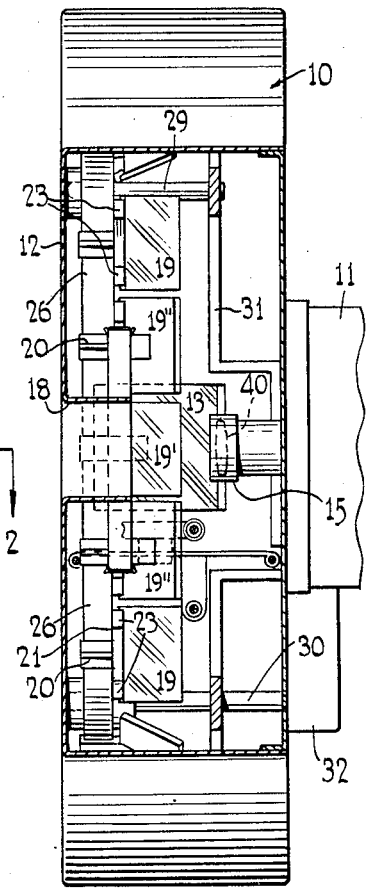
Fig. 3 is a sectional view taken along the line 3—3 of Fig. 1.

When stereoscopic pictures are taken on a single film with a camera having but a single optical axis it has been the practice to employ a stereoscopic device comprising a pair of spaced lateral reflectors symmetrically disposed about the camera's optical axis and situated forwardly of the front lens of the camera. Each of these reflectors was adapted to view the same scene but from a slightly different angle to obtain the usual stereoscopic effect. Alternately to transfer the scenes reflected in these mirrors to the camera for photographing them on consecutive frames, a central reflector was used which was intermittently moved back and forth from a position in which it reflected the image from one of the lateral reflectors into the camera to a second position in which it reflected the image from the other reflector into the camera. As approximately sixteen images had been photographed from each reflector every second to maintain the illusion of motion, it was necessary for the central reflector to change position approximately thirty-two times a second and come to and remain at a dead stop while reflecting the scene for photographing between each interval of motion. A mirror oscillating under such strenuous conditions is subject to large and rapidly reversed stresses which in addition to inducing vibration of the mirror and consequent haziness of the reflected image will strain and rapidly wear the supporting structure and mechanism.

My improved stereoscopic apparatus remedies these defects by employing a series of reflectors which continuously pass in front of the camera lens. Successive reflectors of this series, which maintain a fixed angular relationship with relation to each other when passing before the lens, alternately reflect the image from each reflector into the camera. The mirrors are firmly supported and may move at uniform speed along a straight line during the period that an image is being reflected in order to reflect a clear image free from any vibration into the camera.

Referring now in detail to the drawing, I have illustrated a stereoscopic device 10 embodying my invention attached to the usual motion picture camera 11 of the type which takes a series of consecutive pictures along the length of a film and is adapted to be run at a speed higher than that used in ordinary motion picture work. The stereoscopic device may comprise a housing 12 for the stereoscopic mechanism which may include a pair of outwardly facing angularly disposed spaced lateral reflectors 13 and 14 suitably mounted within the casing and disposed on opposite sides of the camera lens tube 15. If desired the mounting 16 for said reflectors may be so constructed and arranged as to permit adjustment of the mutually relative angular positioning and spacing of the reflectors, such as for example in the manner shown and described in my said copending application Ser. No. 325,140. Viewing apertures 17 and 18 may be provided in the housing in front of the reflectors.

In accordance with my invention, I provide a plurality of reflectors 19 so constructed and arranged that consecutive reflectors such as 19' and 19'' are angularly disposed with respect to each other when approaching and passing the camera lens tube 15. Each of the reflectors 19 may be mounted on a support 20 which may comprise a plate 21 having a triangular wedge 22 upstanding therefrom. The back of the reflector 19 is firmly attached to a diagonally disposed edge of said wedge 22 and one edge of said reflector is firmly attached to the plate 21 in any suitable manner well known to the art. Sliding shoes 23 may be located at the ends of arms 24 extending from the plate 21 for cooperation with mechanism hereinafter described in order to steady the support and reflector carried thereby when the reflector passes in front of the camera lens 15. An L-flange 25 may be provided on the under side of the plate 21 for attaching the reflectors 19 to an endless flexible carrier belt 26. In the embodiment of my invention herein shown and described the belt 26 may be made of rubber and the flange 25 fastened thereto by vulcanization. Consecutive reflectors 19' and 19" are mounted on opposite diagonal edges of the triangular wedge 22 so that said reflectors are angularly disposed with regard to each other when positioned along straight portions of the belt 26. I prefer to mount each of the reflectors 19 at substantially 45° to opposed edges of the support plate 21 so that successive reflectors are substantially complementary disposed with respect to each other.

Means is provided to continuously move the series of reflectors 19 at an unaccelerated and uniform speed in a straight line in front of the lens tube 15. Such means may comprise a pair of sheaves 27 and 28 mounted on shafts 29 and 30 which are journalled at their forward ends in the front wall of the housing 12. The rear ends of the shafts may be journalled in a frame 31 which is suitably supported at the side walls of the housing. One of the shafts 29 or 30 is driven through gear box 32 whose chain of gearing is driven by the same means which drives the film advancing and shutter actuating mechanism 43 of the camera 11. The shafts and sheaves are so constructed and arranged with respect to the camera lens tube 15 that the belt 26 which is mounted on the sheaves and carries the reflectors 19 moves the reflectors in front of the tube 15 in a straight line between the sheaves 27 and 28 and so that each reflector 19 as it passes in front of the lens tube 15 will be disposed at substantially 45° to the axis of said tube.

The movement of the reflectors is synchronized by the gear box 32 with the film advancing and shutter actuating mechanism 43 in order that alternate reflectors will pass in front of the lens tube 15 as successive film frames are exposed.

The dimension of the reflectors 19 perpendicular to their direction of travel should be great enough to have a projected length slightly larger than the diameter of the camera lens 40. The dimension of the reflectors 19 parallel to the path of travel and the spacing between said reflectors is proportional to the speed at which the reflectors pass the lens tube 15, the size of the lens 40 and the time for which the film is exposed in the camera. These dimensions should be such that while one frame of the film is being exposed only one moving reflector will pass in front of the camera lens 40 and that, while the film is advancing from one frame to the next with the camera shutter positioned to prevent exposure, the first reflector will be moved away from the lens and the next consecutive reflector, which is angularly disposed with respect to the first reflector will be moved into position in front of the camera lens. In order to prevent slippage or creeping of the belt 26 relative to the sheaves 27 and 28 and loss of synchronization between the mirrors 19 and the film actuating mechanism, I may provide a plurality of equidistantly spaced projections 41 on the circumference of the sheaves 27 and 28 which are adapted to engage correspondingly spaced holes 42 provided in the belt 26.

Means to support and steady the reflectors 19 as they pass in front of the camera lens tube 15 may also be provided and may comprise a pair of floating U-shaped rails 33 adapted to engage the sliding shoes 23 as the reflectors associated therewith approach and pass the camera lens 40. The rails 33 may be supported from flanges 34 integral with the front wall of the housing 12 by springs 35 centrally attached, as by rivets 36, to the flanges 34. The free outer ends of the springs 35 may be slotted as at 37 slidably and captively to receive the shank of headed projections 38 which extend from the rails 33. The ends 39 of the rails 33 may be slightly flared out in order to minimize the shock of engagement with the sliding shoes 23 and to prevent jamming if a reflector 19 and support 20 should be vibrating appreciably immediately before entering between the rails 33. It will be seen that by this construction any vibration of the supports 20 tending to be set up will be damped out by movement of the spring supported rails 33 relative to each other and by the sliding action of the springs 35 on the rails 33.

Figure 2:
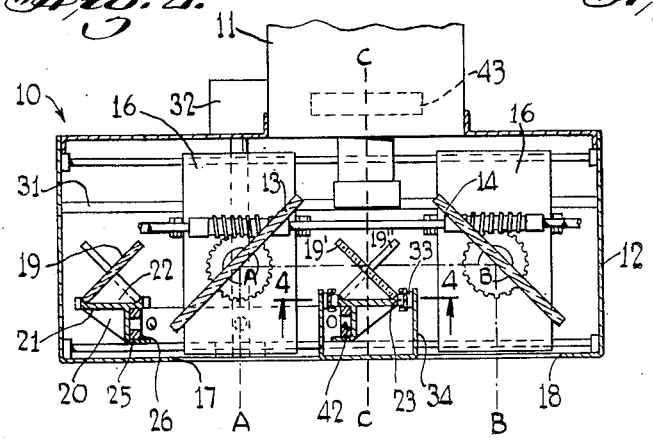
Fig. 2 is a sectional view taken along the line 2—2 of Fig. 1.
Figure 4:
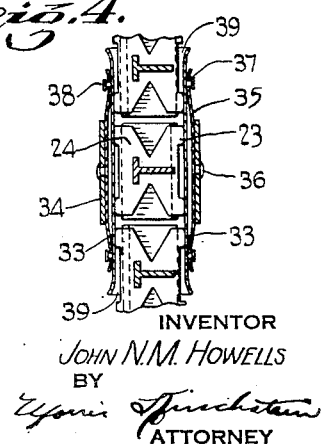
Fig. 4 is a sectional view taken along the line 4—4 of Fig. 2.

In the operation of my improved device the reflectors 19 continuously pass in front of the camera lens tube 15 and successive reflectors alternately deflect each of the optical axes A—A and B—B of the stereoscopic system from the lateral reflectors 13 and 14 into coincidence with the optical axis C—C of the camera as shown in Fig. 2.

Common objects in the right and left images photographed on successive film frames with an apparatus such as above described will be slightly shifted with respect to each other transversely of the film length because of the different angles from which the scene is viewed in each of the spaced right and left lateral reflectors 13 and 14. Due to this displacement the film may be projected to give a stereoscopic effect from a standard projector running at a speed of approximately 32 frames per second.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In a stereoscopic device having two spaced, substantially parallel, stereoscopic optical axes extending away from said device and which device is adapted to be used with motion picture apparatus having an optical axis and means to intermittently move film past said axis, the combination of a pair of stationary spaced reflectors to deflect said stereoscopic axes towards each other, said reflectors being disposed in substantially complementary angular position with respect to each other, a single series of reflectors and means to support and continuously move said series of reflectors in an endless closed path a portion of which passes between said stationary reflectors, so that successive reflectors of said series, as they pass between said stationary reflectors, will be alternately disposed in substantially complementary angular positions paralleling respectively the position of said stationary reflectors whereby successive reflectors of said series will alternately deflect the stereoscopic axes, deflected from said stationary reflectors, into the optical axis of said motion picture apparatus, said series of reflectors being moved by said means at a uniform speed, in the same direction, and in a straight line, when traversing that portion of the path between said stationary reflectors.

2. In a stereoscopic device having two spaced, substantially parallel, stereoscopic optical axes extending away from said device and which device is adapted to be used with a motion picture apparatus having an optical axis and means to intermittently move film past said axis, the combination of a pair of stationary spaced reflectors to deflect said stereoscopic axes towards each other, a single series of reflectors and means to support and continuously move said series of reflectors in an endless closed path a portion of which passes between said stationary reflectors so that successive reflectors of said series, as they pass between said stationary reflectors, will alternately deflect the stereoscopic axes, deflected from the stationary reflectors, into the optical axis of said motion picture apparatus, said series of reflectors being moved by said means at a uniform speed, in the same direction, and in a straight line, when traversing that portion of the path between said stationary reflectors, the speed and motion of said series of reflectors when passing between said stationary reflectors and the length of the individual reflectors in said series being so correlated and synchronized with the motion of the intermittent film advancing means that a single reflector will continuously deflect a stereoscopic axis, which is deflected from a stationary reflector into the optical axis of said motion picture apparatus throughout each period of time said intermittent film advancing means is stationary.

3. A stereoscopic device as set forth in claim 2 wherein the means for supporting and moving said series of reflectors comprises a flexible belt on which successive reflectors of said series are disposed in angular relationship to each other and alternate reflectors are disposed parallel to each other.

4. A stereoscopic device as set forth in claim 2 wherein the means for supporting and moving said series of reflectors comprises a flexible belt on which successive reflectors of said series are disposed in angular relationship to each other and alternate reflectors are disposed parallel to each other, and wherein there is provided means adjacent said belt and between said stationary reflectors to steady said moving reflectors as they pass between said stationary reflectors.

5. A stereoscopic device as set forth in claim 2 wherein the means for supporting and moving said series of reflectors comprises a flexible belt on which successive reflectors of said series are disposed in angular relationship to each other and alternate reflectors are disposed parallel to each other, and wherein there is provided means adjacent said belt and between said stationary reflectors to steady said moving reflectors as they pass between said stationary reflectors, said steadying means comprising a floating member.

6. A stereoscopic device as set forth in claim 2 wherein the means for supporting and moving said series of reflectors comprises a flexible belt on which successive reflectors of said series are disposed in angular relationship to each other and alternate reflectors are disposed parallel to each other, and wherein there is provided means adjacent said belt and between said stationary reflectors to steady said moving reflectors as they pass between said stationary reflectors, said steadying means comprising a pair of spring supported rails between which said reflectors pass.

7. In a stereoscopic device having two, spaced, substantially parallel, stereoscopic, optical axes extending away from said device, and which device is adapted to be used with a motion picture apparatus having a single optical axis and means to intermittently move film past said axis, the combination of a pair of stationary spaced reflectors to deflect said stereoscopic axes towards each other, a single series of reflectors, and means to support and continuously move said series of reflectors in an endless closed path a portion of which passes between said stationary reflectors so that successive reflectors of said series, as they pass between said stationary reflectors, will alternately deflect the stereoscopic axes deflected from the stationary reflectors, into the optical axis of said motion picture apparatus, said series of reflectors being moved by said means at a uniform speed, in the same direction, and in a straight line, when traversing that portion of said path between said stationary reflectors.

8. In a stereoscopic device having two, spaced, substantially parallel, stereoscopic, optical axes extending away from said device, and which device is adapted to be used with a motion picture apparatus having a single optical axis and means to intermittently move film past said axis, the combination of a pair of stationary spaced reflectors to deflect said stereoscopic axes towards each other, a single series of reflectors, successive reflectors in said series being angularly disposed with respect to each other and alternate reflectors being disposed parallel to each other, and means to support and continuously move said series of reflectors in an endless closed path a portion of which passes between said stationary reflectors so that successive reflectors of said series, as they pass between said stationary reflectors, will alternately deflect the stereoscopic axes deflected from the stationary reflectors, into the optical axis of said motion picture apparatus, said series of reflectors being moved by said means at a uniform speed, in the same direction, and in a straight line, when traversing that portion of said path between said stationary reflectors.

9. In a stereoscopic device having two, spaced, substantially parallel, stereoscopic, optical axes extending away from said device, and which device is adapted to be used with a motion picture apparatus having a single optical axis and means to intermittently move film past said axis, the combination of a pair of stationary spaced reflectors to deflect said stereoscopic axes towards each other, a single series of reflectors, means to support and continuously move said series of reflectors in an endless closed path a portion of which passes between said stationary reflectors so that successive reflectors of said series, as they pass between said stationary reflectors, will alternately deflect the stereoscopic axes deflected from the stationary reflectors, into the optical axis of said motion picture apparatus, said series of reflectors being moved by said means at a uniform speed, in the same direction, and in a straight line, when traversing that portion of said path between said stationary reflectors, and means to support and steady said reflectors as they move in front of said optical axis.

10. In a stereoscopic device having two, spaced, substantially parallel, stereoscopic, optical axes extending away from said device, and which device is adapted to be used with a motion picture apparatus having a single optical axis and means to intermittently move film past said axis, the combination of a pair of stationary spaced reflectors to deflect said stereoscopic axes towards each other, a single series of reflectors, and means to support and continuously move said series of reflectors in an endless closed path, a portion of which passes between said stationary reflectors, so that successive reflectors of said series, as they pass between said stationary reflectors, will alternately deflect the stereoscopic axes deflected from the stationary reflectors, into the optical axis of said motion picture apparatus, said series of reflectors being moved by said means at a uniform speed, in the same direction, and in a straight line, when traversing said portion of the path which passes between said stationary reflectors.

11. In a stereoscopic device having two, spaced, substantially parallel, stereoscopic, optical axes extending away from said device, and which device is adapted to be used with a motion picture apparatus having a single optical axis and means to intermittently move film past said axis, the combination of a pair of stationary spaced reflectors to deflect said stereoscopic axes towards each other, a single series of reflectors, means to support and continuously move said series of reflectors in an endless closed path a portion of which passes between said stationary reflectors so that successive reflectors of said series, as they pass between said stationary reflectors, will alternatly deflect the stereoscopic axes deflected from the stationary reflectors, into the optical axis of said motion picture apparatus. said series of reflectors being moved by said means at a uniform speed, in the same direction, and in a straight line, when traversing that portion of said path between said stationary reflectors, and means to synchronize the motion of said reflectors with the means for intermittently moving the film.

12. In a stereoscopic device having two, spaced, substantially parallel, stereoscopic, optical axes extending away from said device, and which device is adapted to be used with a motion picture apparatus having a single optical axis and means to move film past said axis, the combination of a pair of stationary spaced deflectors to deflect said stereoscopic axes towards each other, a single series of optical deflectors and means to support and continuously move said series of deflectors in an endless closed path a portion of which passes between said stationary deflectors and past said optical axis so that successive deflectors of said series, as they pass between said stationary deflectors and move past said optical axis, will alternately deflect the stereoscopic axes into said optical axis, said series of deflectors being moved by said means at a uniform speed, in the same direction, and in a straight line, when traversing said portion of said path and moving past said optical axis and between said stationary deflectors.

13. In a stereoscopic device having two, spaced, substantially parallel, stereoscopic, optical axes extending away from said device, and which device is adapted to be used with a motion picture apparatus having a single optical axis and means to move film past said axis, the combination of a single series of optical deflectors, successive deflectors of said series being angularly disposed with respect to each other and alternate deflectors being being disposed parallel to each other, and means to support and continuously move said series of deflectors in an endless closed path, which includes a portion going past said optical axis, so that successive deflectors of said series, as they pass said optical axis, will alternately deflect the stereoscopic axes into said optical axis, said series of deflectors being moved by said means at a uniform speed, in the same direction, and in a straight line, when traversing said portion of the path going past said optical axis.

JOHN N. M. HOWELLS.